United States Patent
Feynman et al.

(10) Patent No.: US 10,318,872 B1
(45) Date of Patent: Jun. 11, 2019

(54) CONVERTING RULES IN DATA PROCESSING SYSTEMS

(71) Applicant: Ab Initio Technology LLC, Lexington, MA (US)

(72) Inventors: Carl Richard Feynman, Waban, MA (US); Ian Schechter, Sharon, MA (US); David Fournier, Hoboken, NJ (US)

(73) Assignee: Ab Initio Technology LLC, Lexington, MA (US)

( * ) Notice: Subject to any disclaimer, the term of this patent is extended or adjusted under 35 U.S.C. 154(b) by 693 days.

(21) Appl. No.: 14/210,659

(22) Filed: Mar. 14, 2014

Related U.S. Application Data (60) Provisional application No. 61/794,940, filed on Mar. 15, 2013.

(51) Int. Cl.
*G06N 5/04* (2006.01)
*G06N 5/02* (2006.01)

(52) U.S. Cl.
CPC .............. *G06N 5/04* (2013.01); *G06N 5/025* (2013.01)

(58) Field of Classification Search
CPC .................................. G06N 5/025; G06N 5/04
See application file for complete search history.

(56) References Cited

U.S. PATENT DOCUMENTS

| | | | |
|---|---|---|---|
| 2007/0094203 A1* | 4/2007 | Huelsman | G06N 5/02 706/47 |
| 2009/0300748 A1* | 12/2009 | Diehl | H04L 63/0263 726/11 |
| 2010/0199346 A1* | 8/2010 | Ling | H04L 63/0263 726/12 |
| 2012/0047045 A1* | 2/2012 | Gopikrishna | G06Q 10/10 705/26.5 |
| 2014/0201804 A1* | 7/2014 | Uthmani | G06F 21/60 726/1 |

OTHER PUBLICATIONS

Minato, S., et al. "Zero-suppressed BDDs for set manipulation in combinatorial problems." Proceedings of the 30th international Design Automation Conference. ACM, 1993.*
Kristensen, Jesper T., "Generation and Compression of endgame tables in chess with fast random access using OBDDs," Thesis, University of Aarhus, Denmark, May 9, 2005, 159 pgs.
Knuth, Donald E., "The Art of Computer Programming, vol. 4, Pre-Fascicle 4A: A Draft of Section 7.2.1.6: Generating All Trees," Stanford University, Oct. 28, 2005, 87 pgs.
"Logic Synthesis: Binary Decision Diagrams," [online] <users.ece.utexas.edu/~adnan/syn-07/003-BDDs.ppt> downloaded on May 7, 2012, 31 pages.

\* cited by examiner

*Primary Examiner* — Eric Nilsson
(74) *Attorney, Agent, or Firm* — Fish & Richardson P.C.

(57) ABSTRACT

In one aspect, in general, a computer-implemented method includes receiving an order-dependent list of rules generating a binary decision diagram based on the order-dependent list of rules, the binary decision diagram including decision nodes that include expressions including Boolean operators and operands, and generating an order-independent list of rules based on the binary decision diagram.

48 Claims, 7 Drawing Sheets

CONVERTING RULES IN DATA PROCESSING SYSTEMS

CLAIM OF PRIORITY

This application claims priority under 35 USC § 119(e) to U.S. Patent Application Ser. No. 61/794,940, filed on Mar. 15, 2013, the entire contents of which are hereby incorporated by reference.

BACKGROUND

This description relates to converting rules in data processing systems.

Some data processing systems (e.g., database systems) process data according to rules. For example, a rule may specify conditional expressions that include conditions and actions. When the data processing system executes the rule, if a condition is met, an action occurs. A rule is executed when the data processing system evaluates the conditions of the conditional expression to determine if, based on a set of data provided to the data processing system, the conditions are true or false.

SUMMARY

In a first aspect, a method includes, receiving an order-dependent list of rules;

generating a binary decision diagram based on the order-dependent list of rules, the binary decision diagram including decision nodes that include expressions including Boolean operators and operands, and generating an order-independent list of rules based on the binary decision diagram.

In a second aspect according to the first aspect, generating an order-independent list of rules based on the binary decision diagram includes generating a flat expression representation of the binary decision diagram.

In a third aspect according to the first or second aspect, the method includes removing an expression of at least one of the decision nodes of the binary decision diagram.

In a fourth aspect according to the third aspect, removing an expression of at least one of the decision nodes of the binary decision diagram includes determining a semantic meaning of at least one of the operands.

In a fifth aspect according to any of the first through fourth aspects, at least one of the decision nodes includes an operand that includes a bit vector.

In a sixth aspect according to any of the first through fifth aspects, when supplied a set of inputs, the order-dependent list of rules evaluates to a result, and the order-independent list of rules evaluates to the same result.

In a seventh aspect according to any of the first through sixth aspects, the order-dependent list of rules can be processed by a first system but cannot be processed by a second system, the second system being configured to process order-independent rules, and the method includes processing the order-independent list of rules using the second system.

In an eighth aspect, a method includes receiving a first set of rules, generating a binary decision diagram according to the first set of rules, the binary decision diagram having a first decision node that includes an expression having a Boolean operator and operands, at least one of the operands including a bit vector having two or more bits, each bit position in the bit vector corresponding to one item in a first list of items, the bit vector representing a second list of items that includes a subset of items selected from the first list of items, the first decision node representing a decision with respect to the second list of items, and generating a second set of rules based on the binary decision diagram.

In a ninth aspect according to the eighth aspect, each bit position in the bit vector corresponds to a pharmaceutical, and the bit vector represents a list of pharmaceuticals.

In a tenth aspect according to the ninth aspect, the first decision node includes a Boolean operator, the operands include a first operand that represents a first pharmaceutical and a second operand that includes the bit vector, and the expression represents a relation between the first pharmaceutical and the list of pharmaceuticals.

In an eleventh aspect according to any of the eighth through tenth aspects, the first and second sets of rules include rules for processing insurance claims.

In a twelfth aspect according to any of the eighth through eleventh aspects, the first set of rules includes a set of order-dependent rules, and the second set of rules includes a set of order-independent rules.

In a thirteenth aspect according to any of the eighth through twelfth aspects, the binary decision diagram includes a second decision node that includes an expression having a Boolean operator and operands, at least one of the operands including a bit vector corresponding to the first list of items, and wherein the method includes combining the first and second decision nodes to form a third decision node that includes an operand generated based on a result of a Boolean operation on the bit vector in the first decision node and the bit vector in the second decision node.

In a fourteenth aspect according to the thirteenth aspect, when supplied a set of inputs, the first set of rules evaluates to a result, and the second list of rules evaluates to the same result.

In a fifteenth aspect, a method includes receiving a first set of rules having a first constraint, generating a binary decision diagram based on the first set of rules, the binary decision diagram including decision nodes that include expressions including Boolean operators and operands, and generating a second set of rules based on the binary decision diagram, the second set of rules absent the first constraint, wherein, when supplied a set of inputs, the first set of rules evaluates to a result, and the second list of rules evaluates to the same result.

In a sixteenth aspect according to the fifteenth aspect, the first constraint is dependence on order.

One or more of the aspects, alone or in combination, may be represented as a system, or an apparatus, or as a computer readable storage device storing a computer program product including machine readable instructions that, when executed by a computer system, carry out operations of the aspect. As one example, a computer readable storage device can store a computer program product including machine readable instructions that, when executed by a computer system, carry out operations according to any one of the first through sixteenth aspects. As another example, a computer system including one or more processors can include a computer-readable storage device storing a computer program product that includes machine readable instructions that, when executed by the one or more processors, carry out operations according to any one of the first through sixteenth aspects.

Implementations may have one or more of the following advantages. Two systems can be merged and their combined rules can be carried out accurately and efficiently. For example, two insurance systems containing data processing rules for approving pharmaceutical claims can be combined, and the resulting data processing rules can be used to approve the same kind of pharmaceutical claims. The new combined data processing rules will approve the same pharmaceutical claims as the two previous uncombined systems. The system can also be used with other types of systems such as banks which handle financial transactions.

Other features and advantages of the invention will become apparent from the following description, and from the claims.

DESCRIPTION

Many businesses use rules to determine what actions to take under various conditions. For example, insurance companies may implement rules for determining whether certain insurance claims can be approved, and banks may implement rules for determining whether certain financial transactions should be executed. Different businesses may handle rules differently. For example, one insurance company may implement a system in which a set of rules are evaluated in a particular sequence to determine whether an insurance claim is covered. Such rules are referred to as "order-dependent rules" (or "ordered rules") because they are evaluated in a particular order. Another insurance company may implement a system in which all the rules in a set of rules are evaluated independently without any particular order to determine whether an insurance claim is covered. Such rules are referred to as "order-independent rules" (or "unordered rules" or "chain rules") because they are not evaluated in any particular order. A set of order-dependent rules typically cannot be directly processed by a system designed to handle order-independent rules. This document describes a rule-conversion system that implements an efficient way of converting a set of order-dependent rules to a set of order-independent rules so that rules originally designed for a system configured to process order-dependent rules can also be processed by a system configured to process order-independent rules. In this way, two systems can be merged and their combined rules can be carried out accurately and efficiently. For example, two insurance systems containing data processing rules for approving pharmaceutical claims can be combined, and the resulting data processing rules can be used to approve the same kind of pharmaceutical claims. The new combined data processing rules will approve the same pharmaceutical claims as the two previous uncombined systems.

In general, a rule contains a conditional expression (if [condition], then [result]). In some implementations, a set of order-dependent rules are executed in a particular order, and if an expression evaluates to be true, then no further rules are evaluated. In contrast, order-independent rules are not executed in any particular order. Order-independent rules may also have a default case, such that if none of the order-independent rules evaluate to be true, then the default case is true.

In order to translate from order-independent rules to order-dependent rules, the order-independent rules are first translated to a type of data structure called binary decision diagrams, and then the binary decision diagrams are flattened into expressions, and then order-independent rules are generated from the expressions. A binary decision diagram is a representation of an acyclic directed graph that has "decision nodes" which are expressions that represent a choice between two child nodes depending on whether the expressions evaluate to "true" or "false", and has "terminal nodes" which represent a "true" or "false" result for the binary decision diagram.

Decision nodes can include Boolean expressions, e.g., expressions that use Boolean operators and evaluate to "true" or "false." Decision nodes can contain operations more complex than true/false operators. For example, a decision node can operate on a bit vector, and the decision node can represent an operation equivalent to "for each item in this bit vector, evaluate Boolean expression [X]."

The binary decision diagrams can also be optimized to simplify operators in decision nodes that may be redundant. For example, the expression (age>50 & age>60) can be simplified to the expression (age>60); the expression ("male" & "female") can be simplified to (false), and so on. This can be done based our knowledge of what the decision nodes represent in the real world.

Below are examples of order-dependent rules and order-independent rules. For example, an insurance company may have a first insurance approval system that evaluates a set of rules in sequence to determine whether a medical insurance claim is covered under an insurance plan. Each rule has a condition and a result. The rules are processed in sequence until the condition for one of the rules is evaluated to the true, then the process stops. For example, a set of order-dependent rules can be as follows:

Order-dependent Rule 1: Result is "covered" if drug is drug X AND drug Y is in history AND age is under 65.
Order-dependent Rule 2: Result is "requires prior authorization" if drug is drug X.

The first insurance approval system processes Rule 1 and evaluates the condition "drug is drug X AND drug Y is in history AND age is under 65." If the condition is true, then the result is "covered" and Rule 2 is not processed. If the condition in Rule 1 is false, then Rule 2 is processed, and the condition "drug is drug X" is evaluated. For example, if a patient previously received drug Y and is under 65 years old, the first insurance approval system stops after processing Rule 1 and does not process Rule 2 because the condition in Rule 1 evaluates to be true.

For example, another insurance company may have a second insurance approval system that evaluates all the rules in a set of rules independently (without any particular sequence) to determine whether a medical insurance claim is covered under an insurance plan. Each rule has a condition and a result. The rules are designed such that in each rule, the result is "requires prior authorization" if the condition evaluates to true. For example, a set of order-independent rules can be as follows:

Order-independent Rule 3: Result is "requires prior authorization" if drug is drug X and drug Y is not in history.
Order-independent Rule 4: Result is "requires prior authorization" if drug is drug X and drug Y is in history and age is not under 65.

The second insurance approval system processes both Rule 3 and Rule 4 independently, so that the condition "drug is drug X and drug Y is not in history" and the condition "drug is drug X and drug Y is in history and age is not under 65" are both evaluated. An insurance claim will be rejected as requiring prior authorization if the condition in either Rule 3 or Rule 4 evaluates to be true. In this example, the claim is covered only if no condition in Rules 3 and 4 evaluate to be true, i.e., the conditions in both Rules 3 and 4 evaluate to be false.

In the examples above, the set of Rule 3 and Rule 4 is equivalent to the set of Rule 1 and Rule 2. The rule-conversion system can be used to efficiently convert the set of order-dependent Rule 1 and Rule 2 to order-independent Rule 3 and Rule 4 (or other sets of order-independent rules similar to Rule 3 and Rule 4).

For example, the rule-conversion system can express Rule 1 and Rule 2 as binary decision diagrams. The binary decision diagrams are combined by the logic implicit in the ordering of Rules 1 and 2. The result of Rule 1 is "covered," which is the result that can only be achieved in the order-independent system by failing all rules (e.g., if all rules evaluate to "false"). We "subtract" the condition in Rule 1 from the conditions in later rules that may affect the same claim. Both Rules 1 and 2 target drug X, so we cannot reach Rule 2 unless the condition in Rule 1 is false. The overall condition to implement the equivalent of Rule 2 in the order-independent system is Order-dependent rule 2 AND NOT (Order-dependent rule 1), or Rule 5: Result is "requires prior authorization" if drug is drug_X and NOT (drug is drug_X AND drug_Y in history AND age under 65).

If the second insurance approval system is capable of handling such a complex rule, then Rule 5 does not need further processing.

Figure 1:
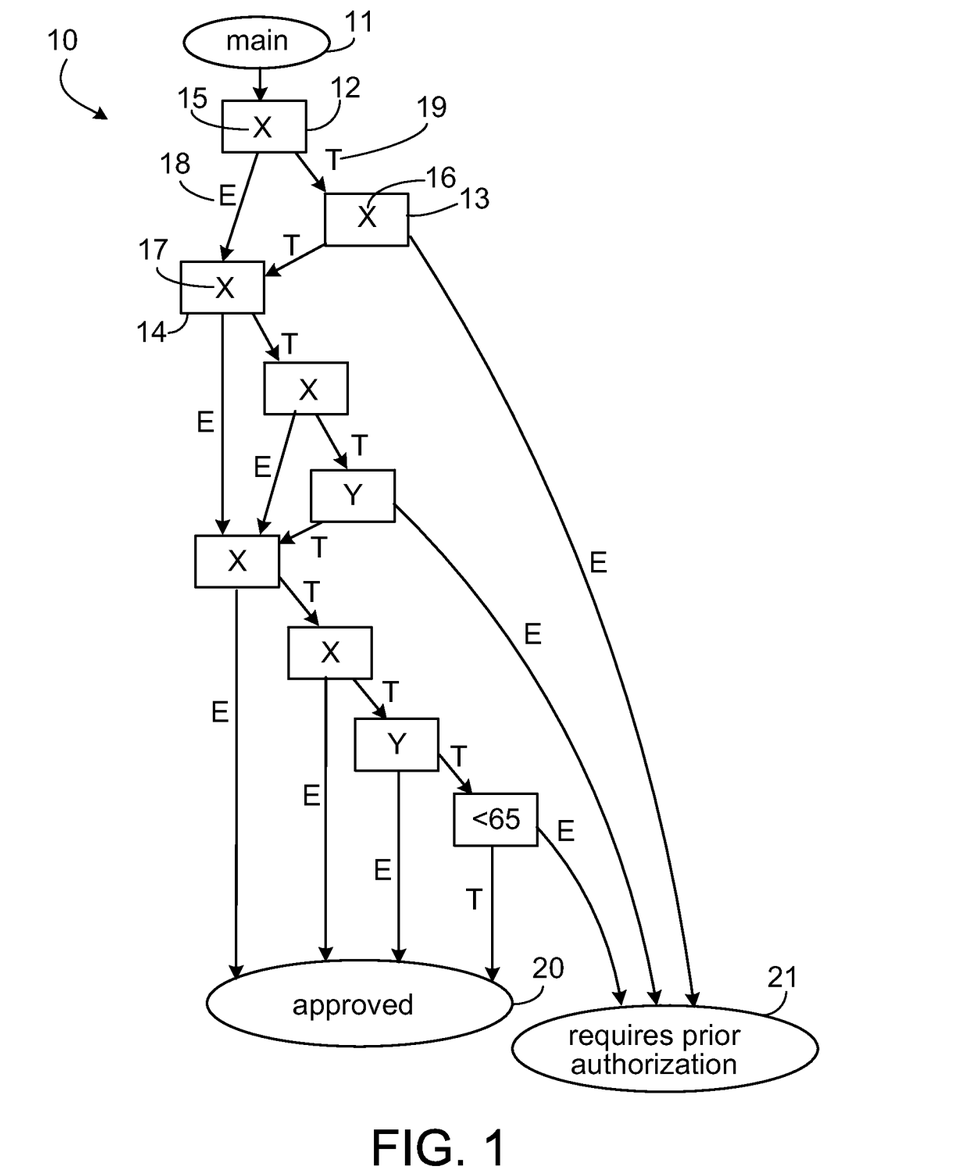
FIG. 1 shows a binary decision diagram.

FIG. 1 shows a binary decision diagram 10 for Rule 5. The diagram 10 is traversed starting at the main node 11. Each node 12, 13, 14 of the diagram 10 contains a test 15, 16, 17 (sometimes called binary decisions). A particular node 12 is connected to two other nodes 13, 14 by segments 18, 19. Each segment 18, 19 represents one of two outcomes for the test 15. The outcome of the test 15 determines which segment 18, 19 to travel. Depending on the outcomes of the tests and thus the path traveled, the diagram 10 ends at one of two outcomes 20, 21.

The binary decision diagram 10 shown in FIG. 1 uses the following shorthand:

T=THEN (if the test is true, travel this segment)
E=ELSE (if the test is false, travel this path)
X=drug is drug X
Y=drug Y in history
<65=age under 65

The binary decision diagram 10 at this point represents the target order-independent rule. If the second insurance approval system cannot handle such complex logic, we can generate simpler rules by traversing the binary decision diagram and, for example, splitting "OR" conditions into multiple rules. In the example order-independent target system described above, all rules are implicitly connected by OR, as any rule implies failure and only failing all rules (e.g., if all rules evaluate to false) results in success.

Traversing the binary decision diagram 10 for the Rule 5 to simplify by splitting OR conditions leads to Rule 6a: Result is "requires prior authorization" if drug is drug_X AND NOT (drug is drug_X)

OR

Rule 6b: Result is "requires prior authorization" if drug is drug_X AND (drug is drug_X) AND NOT (drug_Y in history)

OR

Rule 6c: Result is "requires prior authorization" if drug is drug_X AND (drug is drug_X) AND (drug_Y in history) AND NOT (age under 65)

Rule 6a resolves to false and can be removed. The remaining Rules 6b and 6c (after some simplification using techniques described herein and the binary decision diagram 10) become:

Order-independent Rule 7: Result is "requires prior authorization" if drug is drug_X and drug_Y not in history Order-independent Rule 8: Result is "requires prior authorization" if drug is drug_X and drug_Y is in history and age is not under 65.

Note that order-independent rules 7 and 8 are the same as the order-independent rules 3 and 4 mentioned above.

In some examples, a set of order-dependent rules written for the first insurance approval system can have the following format:

Rule A1: Result is "covered" if condition B1 is met.
Rule A2: Result is "covered" if condition B2 is met.
Rule A3: Result is "covered" if condition B3 is met.
. . .
Rule An: Result is "requires prior authorization" if condition Bn is met.

The first insurance approval system evaluates Rules A1 to An in sequence, and if the condition Bi of Rule Ai is met, the result is "covered" and the rules after Rule Ai are not processed. The result is "requires prior authorization" only when the conditions B1 to Bn-1 are false and the condition Bn is true.

For example, a set of order-independent rules written for the second insurance approval system can have the following format:

Rule C1: Result is "requires prior authorization" if condition D1 is met.
Rule C2: Result is "requires prior authorization" if condition D2 is met.
Rule C3: Result is "requires prior authorization" if condition D3 is met.
. . .
Rule Cm: Result is "requires prior authorization" if condition Dm is met.

The second insurance approval system evaluates all of the rules Rules C1 to Cm and determines that an insurance claim is "covered" only if all of the conditions D1 to Dm evaluate to be false. If any of the conditions D1 to Dm evaluates to be true, the insurance claim is rejected. A rule-conversion system can convert the set of order-dependent rules A1 to An to the set of order-independent rules C1 to Cm.

Although the examples here refer to approval of drugs, these techniques could be used in other applications. For example, the rules could be used for inspection policies for aircraft. The binary decision diagram 10 could be interpreted using the following shorthand:

X=engine is model_X
Y=engine contains replacement_part_Y
<65=engine has operated for more than 65 hours since last inspection Similarly, alternative versions of rules 7 and 8 could read as follows:

Order-independent Rule 7-2: Result is "requires engine inspection" if engine is model_X and engine does not contain replacement_part_Y Order-independent Rule 8-2: Result is "requires engine inspection" if engine is model_X and engine contains replacement_part_Y and engine has operated for more than 65 hours since last inspection.

Figure 2:
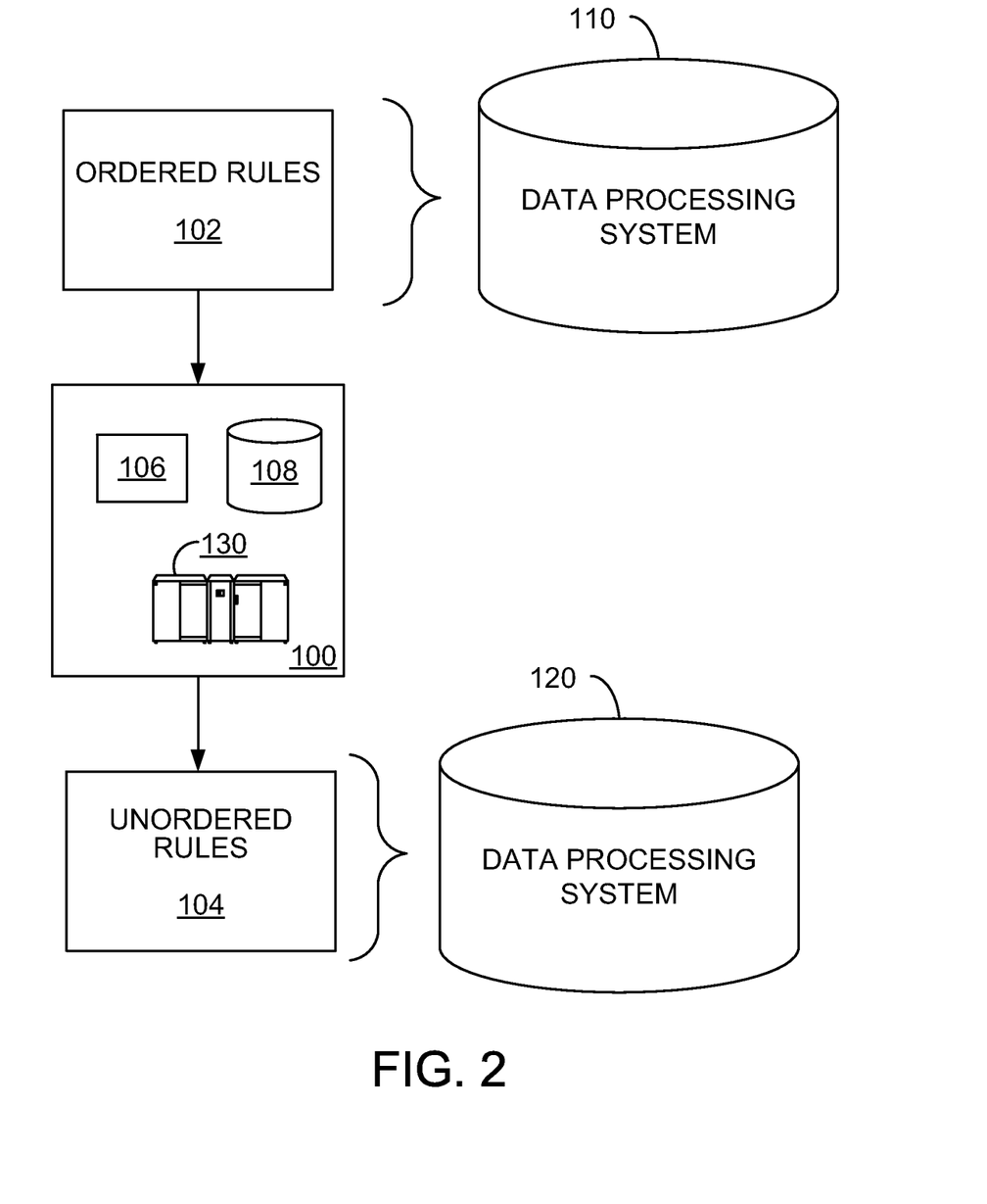
FIG. 2 shows a computer system and related components.

FIG. 2 shows a computer system 100 and related components. The computer system 100 can be used to convert a first set of rules 102 to a second set of rules 104. The first set of rules 102 is formatted for use with a first data processing system 110, and the second set of rules is formatted for use with a second data processing system 120.

The first set of rules 102 is formatted such that the rules are order-dependent rules, in which the rules depend on the order in which they are executed. The computer system 100 can process the first set of rules 102 in a way that removes the dependency on the order in which they are executed. In doing so, the computer system 100 can use the processed rules to generate the second set of rules 104 to be an order-independent set of rules.

For example, the first data processing system 110 can be a first insurance approval system that processes a set of rules in a sequential order to determine whether a medical insurance claim can be approved. The second data processing system 120 can be a second insurance approval system that processes all of the rules in a set of rules independently to determine whether a medical insurance claim can be approved. The computer system 100 can be a rule-conversion system that converts a first set of rules designed to be processed by the first insurance approval system into a second set of rules that can be processed by the second insurance approval system.

The computer system 100 performs the conversion using a binary decision diagram 106 as an intermediate form. A binary decision diagram is a representation of a directed acyclic graph that has decision nodes including a single entry node, as well as two terminal nodes, such that the terminal nodes represent binary choices (such as 'yes'/'no' or 'true'/'false'). In this way, a binary decision diagram can represent a set of expressions that evaluate to one of two outcomes.

In some examples, order-dependent rules contain redundancies, and so the techniques described here to convert the order-dependent rules to order-independent rules can remove redundancies. A conversion from order-dependent rules to order-independent rules may introduce additional redundancy, and so binary decision diagrams can be used to reduce this additional redundancy.

The computer system 100 performs the conversion using semantic definition data 108. The semantic definition data 108 includes definitions of variables or values used in conditional expressions. The semantic definition data 108 can be used to reduce the number of conditions in a conditional expression based on the semantic meaning of the variables and values. The semantic definition data 108 may be received by the computer system 100 from a source other than the computer system 100, for example, the first data processing system 110, or a different source.

In some implementations, the computer system 100 includes a processing system 130 or multiple processing systems, e.g., a server computer or multiple server computers.

Figure 3:
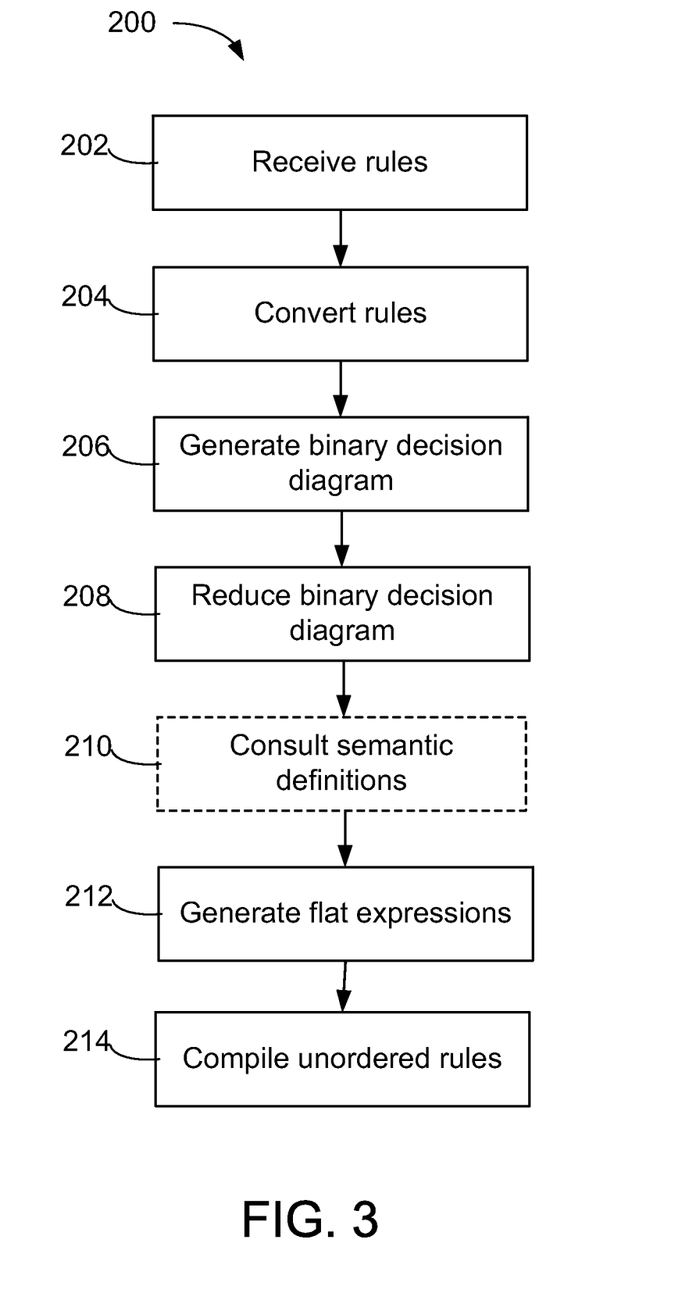
FIG. 3 is a flowchart.

FIG. 3 shows a flowchart for an exemplary rule conversion procedure 200. The procedure 200 can be carried out by the computer system 100 shown in FIG. 2.

In procedure 200, a set of order-dependent rules is received 202. The order-dependent rules may be used by a data processing system (e.g., the first data processing system 110 shown in FIG. 1). As one example, the order-dependent rules may be used by a data processing system that processes data related to insurance claims for pharmaceuticals. For example, the order-dependent rules can be the following:

Rule 9: Result is "covered" if drug is Drug_X and patient has had Drug_Y three times in the last six months.

Rule 10: Result is "requires prior authorization" if drug is Drug_X and (patient has never had Drug_X before or patient age is <21)

Here, Rule 10 is only processed (e.g., the conditional expressions of the rule are executed) if the condition in Rule 9 evaluate to false. If the condition of the first rule is met, the second rule need not be processed, since the second rule is only applicable in situations in which a claim is not covered without prior authorization.

The order-dependent rules are converted 204 to order-independent rules. In some implementations, order-independent rules can be generated by adding, to an order-dependent rule, the conditions of the other order-dependent rules, joined by an "and not" operator. For example, two order-dependent rules, order-dependent rule A and order-dependent rule B, can be converted to the following order-independent rules:

Order-independent Rule A: (order-dependent Rule A conditions) and not (order-dependent Rule B conditions)

Order-independent Rule B: (order-dependent Rule B conditions) and not (order-dependent Rule A conditions)

Rule 9 and Rule 10 above can be converted to the following order-independent rules:

Rule 11: Result is "covered" if (drug is Drug_X and patient has had Drug_Y three times in the last six months) AND NOT (drug is Drug_X and (patient has never had Drug_X before or patient age is <21))

Rule 12: Result is "requires prior authorization" if (drug is Drug_X and (patient has never had Drug_X before or patient is <21)) AND NOT (drug is Drug_X and patient has had Drug_Y three times in the last six months)

These order-independent rules are more complex than the order-dependent rules which may increase processing time compared to less complex rules. Further, if there are many order-dependent rules, the order-independent rules become more complex the more order-dependent rules there are. A binary decision diagram can be used to reduce the complexity of each rule.

A binary decision diagram is generated 206 from each of the order-independent rules. For example, a binary decision diagram can be generated from Rule 11 and another binary decision diagram can be generated from Rule 12. Each binary decision diagram contains decision nodes that include conditional expressions including Boolean operators and operands.

Each binary decision diagram is reduced 208. Binary decision diagrams can be reduced using algorithms for binary decision diagram reduction. Algorithms for binary decision diagram reduction are described in section 7.1.4 of "The Art of Computer Programming, Volume 4A: Combinatorial Algorithms, Part 1" by Donald Knuth, published by Addison-Wesley, copyright 2011, which is hereby incorporated by reference. In some examples, a binary decision diagram can be reduced by merging isomorphic subgraphs of the binary decision diagram and eliminate any node of the binary decision diagram whose two children are isomorphic. The result of the reduction is typically a binary decision diagram with fewer nodes.

Binary decision diagrams can be reduced by re-arranging nodes so that nodes containing the same binary decision are adjacent to each other, thus rendering them redundant, and then eliminating the redundant adjacent nodes to produce a less complex binary decision diagram. The goal is to produce a binary decision diagram in which a) no path through the BDD encounters the same binary decision twice, and b) that the order of the tests encountered on any path is consistent between the different paths. Any binary decision diagram can be reduced to a single binary decision diagram with these two properties.

Figure 4A:
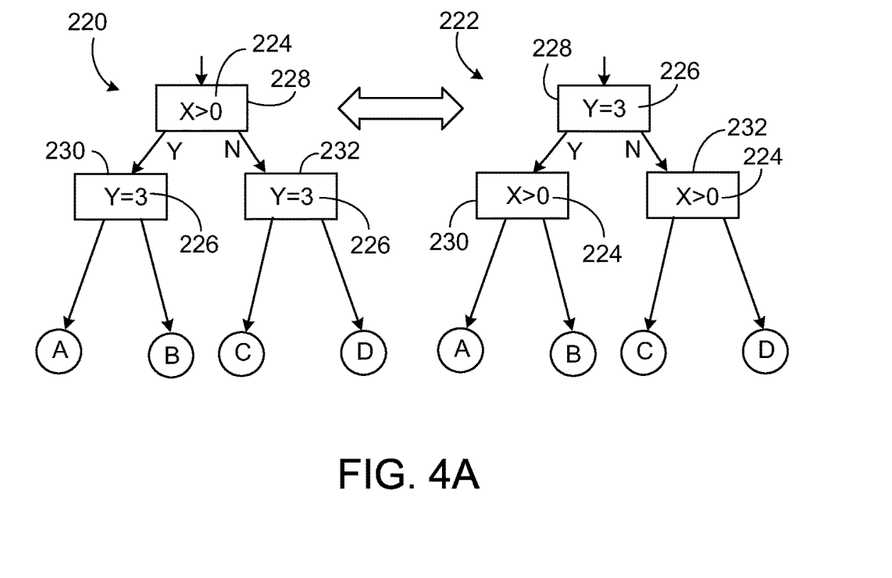
FIGS. 4A to 4C show portions of a binary decision diagram.
Figure 4B:
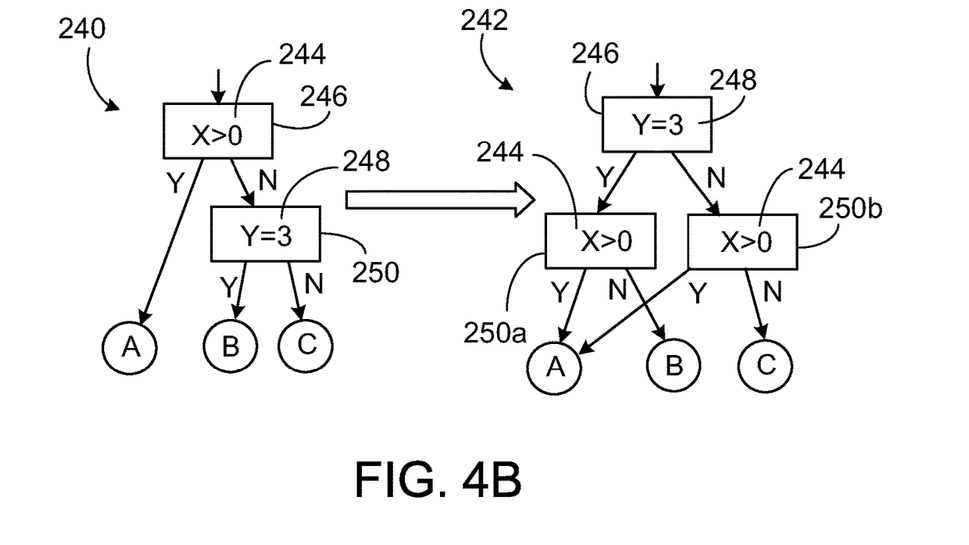
Figure 4C:
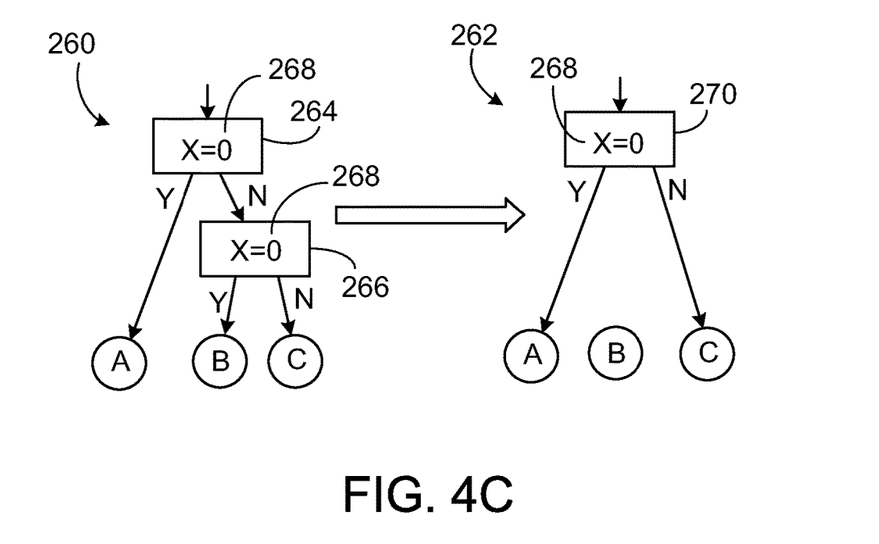

FIG. 4A-FIG. 4C show examples of reducing binary decision diagrams. FIG. 4A shows a portion 220 of a binary decision diagram and an equivalent 222 to the binary decision diagram portion. The portion 220 can be converted to the equivalent 222 by a technique which here we call "flipping."

The portion 220 has two binary decisions, X>0 and Y=3, also referred to as tests. Various combinations of the outcomes of these tests (e.g., yes or no) lead to other portions of the binary decision diagram, represented by circles A, B, C and D. When this technique is applied, the first test 224 (X>0) is swapped for the second test 226 (Y=3) that appears lower in the diagram. This could be done in response to a determination that the first test 224 (X>0) is immediately below a node containing another Y=3 test, and so the second test 226 could be flipped to the node above so that the second test 226 is adjacent to the other Y=3 test.

The first test 224 appears in a higher node 228 in the portion 220 and the second test 226 appears in lower nodes 230, 232 in the portion 220. In the equivalent 222, the first test 224 appears in the lower nodes 230, 232 and the second test 226 appears in the higher node 228. If the same values of X and Y are applied to the portion 220 and the equivalent 222, the outcomes (A, B, C, or D) will be the same for both the portion 220 and the equivalent 222. This is because both the first test 224 and the second test 226 are evaluated one after another; the order of the two does not affect the outcome.

FIG. 4B shows another portion 240 of a binary decision diagram and an equivalent 242 to the binary decision diagram portion. The "flipping" technique can also be applied to the portion 240 of the binary decision diagram in the same manner as above.

Here, the portion 240 has two tests, X>0 and Y=3. The first test 244 appears in a higher node 246 in the portion 240 and the second test 248 appears in a lower node 250 in the portion 240. Because the first test 244 is always evaluated before the second test 248 in the portion 240, the version of the flipping technique applied here duplicates the first test 244 when the equivalent 242 is generated. Thus, the equivalent has the first test 244 in two lower nodes 250a, 250b, and the second test 248 in the higher node 246.

FIG. 4C shows an example of another portion 260 of a binary decision diagram and its equivalent 262. The portion 260 can be converted to the equivalent 262 by a technique which here we call "merging." Here, the portion 260 has a first node 264 adjacent to a second node 266 both containing the same test 268 (X=0). In the equivalent 262, the two nodes 264, 266 can be "merged" into a single new node 270 containing the test 268. When nodes are combined in this way, one of the results of the second node 266 (here, the result "B") cannot be reached because it would require the test 268 to both be true and not true, which is not possible. If no other node in the complete binary decision diagram points to the result that cannot be reached after the reduction, then that result can be removed (e.g., "B" could be removed).

The flipping and merging techniques described here can be performed on any nodes in any order.

The reduction of the binary decision diagram can include generating expressions containing vectors representing multiple items. A vector can be used to evaluate multiple conditions in a single expression. For example, continuing with the example of rules used for insurance claims for pharmaceuticals, a series of expressions may be evaluated to determine if a drug is among several possible drugs. The expressions can be as follows:

Expression (1): Claim is not covered if drug is drug1
Expression (2): Claim is not covered if drug is drug3
Expression (3): Claim is not covered if drug is drug5

Thus, expressions (1) through (3) determine whether a drug is one of drug1, drug3, or drug5. When the binary decision diagram containing these expressions is reduced, the expressions can be merged into a single expression containing a vector that represents all of these drugs. An example of a conditional expression using a vector is as follows:

Expression (4): Claim is not covered if drug is one of the drugs in vector [drug1 drug3 drug5]

Here, expression (4) is equivalent to expressions (1) through (3), because the vector represents each of drug1, drug3, and drug5. The elements of the vector are equivalent to operands of a Boolean "or" operator. In this way, expression (4) is indicating that "Claim is not covered if drug is drug1, or drug 3, or drug 5."

In some implementations, the vector may be a vector of bits, such that each bit of the vector is set to "1" or "on" if an element of a corresponding look-up table is relevant to the conditional expression containing the vector. In the above example, the vector "[drug1 drug3 drug5]" can be represented as a bit vector "[10101]" in which the first, third, and fifth positions of the vector are set to "1" to indicate that the drugs in a corresponding lookup table are to be used in the conditional expression. The lookup table can be as follows:

Lookup Table (1):

| Bit Position | Drug |
|---|---|
| 1 | drug1 |
| 2 | drug2 |
| 3 | drug3 |
| 4 | drug4 |
| 5 | drug5 |

Thus, according to lookup table (1), the bit vector "[10101]" identifies drug1, drug3, and drug5.

In some implementations, the reduction of a binary decision diagram can include merging two decision nodes representing conditional expressions containing vectors. For example, the binary decision diagram may include nodes representing the following expressions:

Expression (5): Claim is not covered if drug is one of the drugs in vector [drug1 drug3 drug5]
Expression (6): Claim is not covered if drug is one of the drugs in vector [drug1 drug 4]

Because these expressions are identical except for the values of the vectors, the expression can be merged by combining the vectors. For example, if the vectors are bit vectors, the bit vectors can be merged by applying an "or" operation to the vectors and using the resulting vector in the merged expression. Because applying a Boolean OR operation to vector [1 0 1 0 1] and vector [1 0 0 1 0] results in vector [1 0 1 1 1], the merged expression can be the following:

Expression (7): Claim is not covered if drug is one of the drugs in vector [drug1 drug3 drug4 drug5]

Thus, vectors can be used to reduce the number of expressions (and number of decision nodes) in a binary decision diagram.

In some implementations, the procedure 200 may merge expressions into a single expression containing a bit vector, or merge expressions already containing bit vectors, prior to the step of generating a binary decision diagram.

The reduction of a binary decision diagram can also be performed using semantic definitions, for example, as defined in the semantic definition data 108 shown in FIG. 2. Semantic definitions set forth information about values and variables that may be used in conditional expressions. For example, in the real world, a human being cannot be both male and female. In this example, the semantic definition data may set forth the following expressions:

Expression (8): if (gender is male) then (gender is not female)

Expression (9): if (gender is female) then (gender is not male)

When the binary decision diagram is reduced, the procedure 200 can include an optional step of consulting 210 the semantic definition data to determine if any nodes can be eliminated. As one example, one decision node of the binary decision diagram may evaluate whether gender is female. A "true" condition of the decision node may lead to a branch of the binary decision diagram containing a subsequent node that evaluates whether gender is male. In this case, the procedure 200 can eliminate the decision node that evaluates whether gender is male, and retain only the decision nodes that are evaluated when the eliminated decision node evaluates to "false." Similarly, if a decision node contains a condition such as (if gender is male and gender is female), then the condition can be eliminated. This is performed based on expressions such as expressions (8) and (9) in the semantic definition data.

A flat expression of each reduced binary decision is generated 212. The flat expression is a series of if-then-else statements generated from the nodes of the binary decision diagram. An if-then-else statement is a type of conditional expression in which one of two actions is taken depending in whether a specified condition is met.

A set of order-independent rules is compiled 214. The set of order-independent rules is made up of each flat expression generated by the procedure. For example, if N order-independent rules are generated in step 204, there will be N flat expressions, and the set of order-independent rules compiled in step 214 includes the N flat expressions (N being a positive integer). The set of order-independent rules is functionally equivalent to the set of order-dependent rules received by the procedure. In this way, when the set of order-independent rules is executed, the result will be identical to an execution of the order-dependent rules.

For example, the order-independent rules generated from the order-dependent rules can be the following:

Rule 13: Claim requires prior authorization if drug is Drug_X and patient has never had Drug_X before and patient has not had Drug_Y three times in the last six months Rule 14: Claim requires prior authorization if drug is Drug_X and patient is <21 and patient has not had Drug_Y three times in the last six months The combination of Rules 13 and 14 is functionally equivalent to the combination of Rules 1 and 2 above. Rules 13 and 14 can be executed in any order, e.g., Rule 14 after Rule 13, or Rule 13 after Rule 14. If neither of the rules evaluates to true, then a default case is true. For example, the default case may be that an insurance claim is covered without prior authorization.

The following provides an example in which a binary decision diagram is used to simplify a complex Boolean expression.

Figure 5:
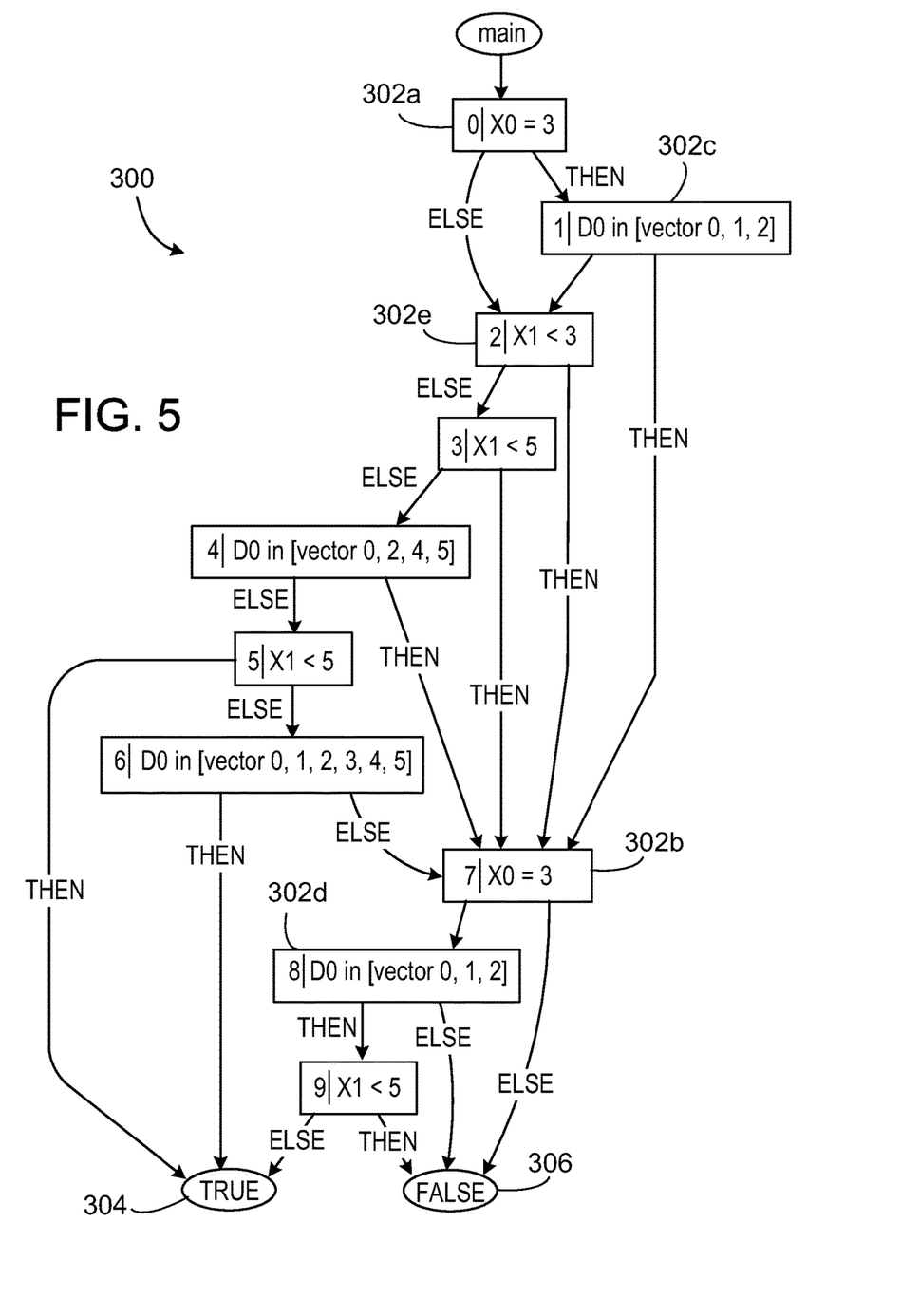
FIG. 5 shows a binary decision diagram.

FIG. 5 shows a binary decision diagram 300. The example is based on the following set of input expressions, where if any of the input expressions are false, the result is false. For example, these expressions could be used to evaluate whether a drug is covered by an insurance subscriber's insurance. If any of these expressions are false, the drug is not covered.

Input expression set 1:
"X0=3"
"X1<3"
"X1<5"
"D0 in [0 2 4 5]"
"D0 in [0 1 3 4 5]"
"D0 in [0 1 2]"

The binary decision diagram is a representation of the following rule, which could be an example of an order-independent rule generated from the set of order-dependent input expressions in input expression set 1

Rule 15: Result is "true" if ((NOT (X0=3) AND (D0 in [0 1 2])) AND ((NOT (X1<3) OR ((X1<5) OR (D0 in [0 2 4 5]))) AND ((X1<5) OR (D0 in [0 1 3 4 5])))) OR ((X0=3) AND (D0 in [0 1 2])) AND (NOT X1<5)

Here, Rule 15 contains bit vectors, and so a prior processing step may have generated each conditional expression that includes a bit vector by merging multiple expressions, as described above.

As shown in FIG. 5, the binary decision diagram 300 contains nodes 302a-e each representing conditional expressions of Rule 15. A processing system can traverse the binary decision diagram 300 by evaluating the nodes. When a node 302a is evaluated and the condition is met (i.e., the condition is true), then the processing system can proceed to one node 302c that is next in the sequence. If the node 302a is evaluated and the condition is not met (i.e., the condition is false), then the processing system can proceed to a different node 302e that is next in the sequence. Once the nodes 302a-e have all been evaluated, the processing system will reach a true node 304 or a false node 306 to determine whether the entire Rule 15 represented by the binary decision diagram 300 evaluates true or false.

Figure 6:
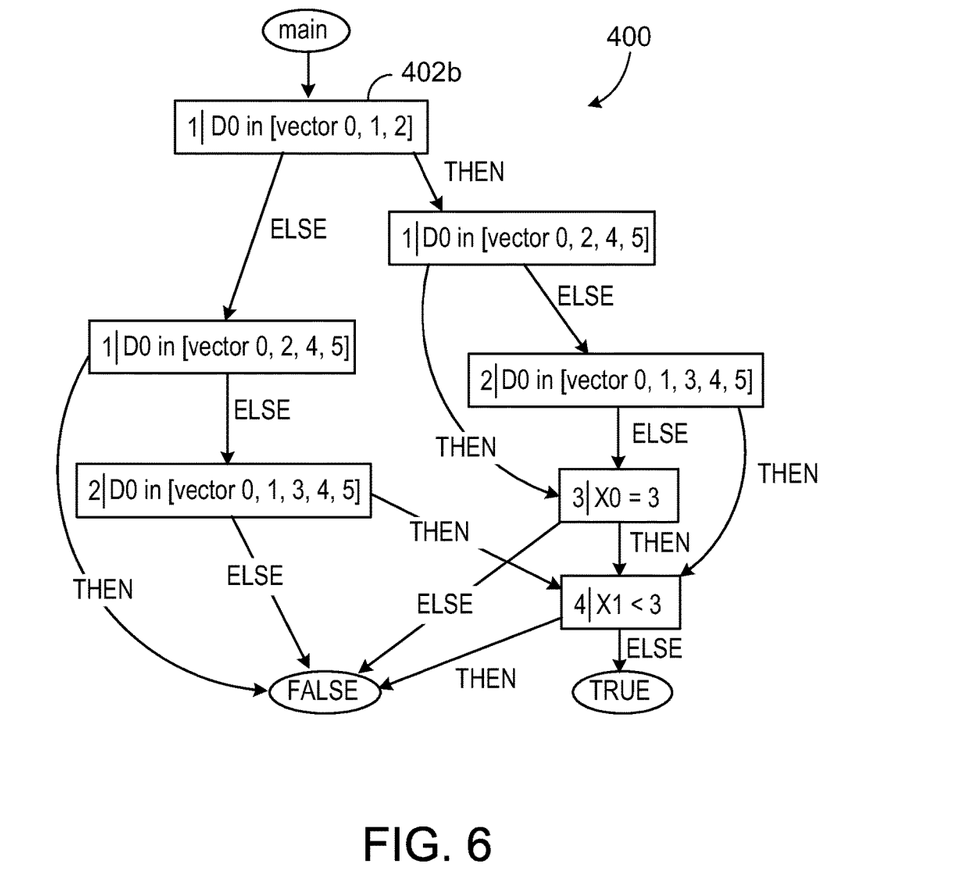
FIG. 6 shows a reduced binary decision diagram.

FIG. 6 shows a reduced binary decision diagram 400. For example, this binary decision diagram 400 can be generated as part of the procedure 200 shown in FIG. 3. This binary decision diagram 400 is functionally equivalent to the binary decision diagram 300 shown in FIG. 3, such that a processing system that traverses each of the two binary decision diagrams 300, 400 will, for the same inputs, arrive at the same result. The reduced binary decision diagram 400 has only seven nodes, whereas the binary decision diagram 300 has ten nodes, and so the average-case traversal of the reduced binary decision diagram 400 may take less computational time than the average-case traversal of the binary decision diagram 300.

The reduced binary decision diagram 400 can be generated based on the "flipping" and "merging" techniques shown in FIGS. 4A to 4C. The reduced binary decision diagram 400 has fewer nodes because some of the nodes of the original binary decision diagram 300 have been merged. For example, two of the nodes 302a, 302b have been merged into a single node 402a, and two other nodes 302c, 302d have been merged into another single node 402b.

The reduced binary decision diagram 400 is equivalent to a series of if-then-else statements, in which each node represents a condition of an if statement, and the subsequent two nodes represent the actions to take for the "then" case and the "else" case, respectively. In this way, the reduced binary decision diagram 400 can be represented as the following if-then-else statements:

Statement (0_0): if D0 in vector [0, 1, 2] then 1_1 else 1_0.

Statement (1_0): if D0 in vector [0, 2, 4, 5] then FALSE else 2_0.

Statement (1_1): if D0 in vector [0, 2, 4, 5] then 3_0 else 2_1.

Statement (2_0): if D0 in vector [0, 1, 3, 4, 5] then 4_0 else FALSE.

Statement (2_1): if D0 in vector [0, 1, 3, 4, 5] then 4_0 else 3_0.

Statement (3_0): if X0=3 then 4_0 else FALSE.

Statement (4_0): if X1<3 then FALSE else TRUE.

Statements (0_0)-(4_0) are together a "flat expression" of the reduced binary decision diagram 400, and can be used together as a single rule in a data processing system that uses order-independent rules.

The rule conversion approach described above can be implemented using software for execution on a computer, e.g., the computer system 100 shown in FIG. 1. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage device (e.g., a non-transitory storage device such as solid state memory or media, or magnetic or optical media) readable by a general or special purpose programmable computer, for configuring and operating the computer when the storage device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, the techniques above show binary decision diagrams that arrive on one of two outcomes. These techniques could also be used with a system that processes rules to arrive on one or three or more outcomes.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computer-implemented method for converting an order-dependent list of data processing rules capable of being processed by a first data processing system comprising one or more computer processors to an order-independent list of data processing rules capable of being processed by a second data processing system comprising one or more computer processors, the method including:
   receiving a first order-dependent list of data processing rules,
   wherein a rule of the order-dependent list of data processing rules includes a condition that includes a Boolean operator applied to a data variable when the rule is processed by the first data processing system;
   identifying the conditions of two of the order-dependent data processing rules of the first order-dependent list of data processing rules;
   generating a new order-dependent data processing rule based on the two of the order-dependent data processing rules of the first order-dependent list of data processing rules, the new order-dependent data processing rule including one of the identified conditions from one of the at least two order-dependent data processing rules, and the new order-dependent data processing rule including another identified condition from another of the two order-dependent data processing rules;
   generating a second order-dependent list of data processing rules including the new order-dependent data processing rule;
   generating a binary decision diagram based on the second order-dependent list of data processing rules, the binary decision diagram including decision nodes that include expressions including Boolean operators and operands;
   generating an order-independent list of data processing rules based on the binary decision diagram; and
   providing the order-independent list of rules to the second data processing system.

2. The method of claim 1, in which generating an order-independent list of rules based on the binary decision diagram includes generating a flat expression representation of the binary decision diagram.

3. The method of claim 1 further including:
   removing an expression of one of the decision nodes of the binary decision diagram.

4. The method of claim 3 in which removing an expression of one of the decision nodes of the binary decision diagram includes determining a semantic meaning of one of the operands.

5. The method of claim 1 in which one of the decision nodes includes an operand that includes a bit vector.

6. The method of claim 1 in which, when supplied a set of inputs, the first order-dependent list of rules evaluates to a result, and the order-independent list of rules evaluates to the same result.

7. The method of claim 1 in which the first order-dependent list of rules can be processed by a first system but cannot be processed by a second system, the second system being configured to process order-independent rules, and the method includes processing the order-independent list of rules using the second system.

8. The method of claim 1, wherein at least one rule of the order-dependent list of data processing rules includes at least one condition that includes at least one Boolean operator applied to at least one data variable when the at least one rule is processed by the first data processing system.

9. The method of claim 8, comprising identifying the conditions of at least two of the order-dependent data processing rules of the first order-dependent list of data processing rules.

10. The method of claim 9, comprising generating at least one new order-dependent data processing rule based on the at least two of the order-dependent data processing rules of the first order-dependent list of data processing rules, the at least one new order-dependent data processing rule including at least one of the identified conditions from one of the at least two order-dependent data processing rules, and the at least new order-dependent data processing rule including at least one other identified condition from another of the at least two order-dependent data processing rules.

11. The method of claim 10, comprising generating a second order-dependent list of data processing rules including the at least new order-dependent data processing rule.

12. A computer-implemented method for converting an order-dependent list of data processing rules capable of being processed by a first data processing system comprising one or more computer processors to an order-independent list of data processing rules capable of being processed by a second data processing system comprising one or more computer processors, the method including:
receiving a first set of rules, wherein the first set of rules is based on data processing rules capable of being processed by a first data processing system comprising one or more computer processors, wherein a rule of the first set of rules includes a condition that includes a Boolean operator applied to a data variable when the rule is processed by the first data processing system;
generating a binary decision diagram according to the first set of rules, the binary decision diagram having a first decision node that includes an expression having a Boolean operator and operands, one of the operands including a bit vector having two or more bits, each bit position in the bit vector corresponding to one item in a first list of items, the bit vector representing a second list of items that includes a subset of items selected from the first list of items, the first decision node representing a decision with respect to the second list of items;
generating a second set of rules based on the binary decision diagram; and
providing the second set of rules to a second data processing system comprising one or more computer processors and capable of processing the second set of rules.

13. The method of claim 12 in which each bit position in the bit vector corresponds to a pharmaceutical, and the bit vector represents a list of pharmaceuticals.

14. The method of claim 13 in which the first decision node includes a Boolean operator, the operands include a first operand that represents a first pharmaceutical and a second operand that includes the bit vector, and the expression represents a relation between the first pharmaceutical and the list of pharmaceuticals.

15. The method of claim 12 in which the first and second sets of rules include rules for processing insurance claims.

16. The method of claim 12 in which the first set of rules includes a set of order-dependent rules, and the second set of rules includes a set of order-independent rules.

17. The method of claim 12 in which the binary decision diagram includes a second decision node that includes an expression having a Boolean operator and operands, one of the operands including a bit vector corresponding to the first list of items, and wherein the method includes combining the first and second decision nodes to form a third decision node that includes an operand generated based on a result of a Boolean operation on the bit vector in the first decision node and the bit vector in the second decision node.

18. The method of claim 12 in which, when supplied a set of inputs, the first set of rules evaluates to a result, and the second list of rules evaluates to the same result.

19. A non-transitory computer-readable medium storing software including instructions for causing a computing system to carry out operations for converting an order-dependent list of data processing rules capable of being processed by a first data processing system comprising one or more computer processors to an order-independent list of data processing rules capable of being processed by a second data processing system comprising one or more computer processors, the operations including:
receiving a first order-dependent list of data processing rules,
wherein a rule of the order-dependent list of data processing rules includes a condition that includes a Boolean operator applied to a data variable when the rule is processed by the first data processing system;
identifying the conditions of two of the order-dependent data processing rules of the first order-dependent list of data processing rules;
generating a new order-dependent data processing rule based on the two of the order-dependent data processing rules of the first order-dependent list of data processing rules, the new order-dependent data processing rule including one of the identified conditions from one of the two order-dependent data processing rules, and the new order-dependent data processing rule including another identified condition from another of the two order-dependent data processing rules;
generating a second order-dependent list of data processing rules including the new order-dependent data processing rule;
generating a binary decision diagram based on the second order-dependent list of data processing rules, the binary decision diagram including decision nodes that include expressions including Boolean operators and operands;
generating an order-independent list of data processing rules based on the binary decision diagram; and
providing the order-independent list of rules to the second data processing system.

20. The computer-readable medium of claim 19, in which generating an order-independent list of rules based on the binary decision diagram includes generating a flat expression representation of the binary decision diagram.

21. The computer-readable medium of claim 19, the operations including:
removing an expression of one of the decision nodes of the binary decision diagram.

22. The computer-readable medium of claim 21 in which removing an expression of one of the decision nodes of the binary decision diagram includes determining a semantic meaning of one of the operands.

23. The computer-readable medium of claim 19 in which one of the decision nodes includes an operand that includes a bit vector.

24. The computer-readable medium of claim 19 in which, when supplied a set of inputs, the first order-dependent list of rules evaluates to a result, and the order-independent list of rules evaluates to the same result.

25. The computer-readable medium of claim 19 in which the first order-dependent list of rules can be processed by a first system but cannot be processed by a second system, the second system being configured to process order-independent rules, and the method includes processing the order-independent list of rules using the second system.

26. A non-transitory computer-readable medium storing software including instructions for causing a computing system to carry out operations for converting an order-dependent list of data processing rules capable of being processed by a first data processing system comprising one or more computer processors to an order-independent list of data processing rules capable of being processed by a second data processing system comprising one or more computer processors, the operations including:
receiving a first set of rules, wherein the first set of rules is based on data processing rules capable of being processed by a first data processing system comprising one or more computer processors, wherein a rule of the first set of rules includes a condition that includes a Boolean operator applied to a data variable when the rule is processed by the first data processing system;
generating a binary decision diagram according to the first set of rules, the binary decision diagram having a first decision node that includes an expression having a Boolean operator and operands, one of the operands including a bit vector having two or more bits, each bit position in the bit vector corresponding to one item in a first list of items, the bit vector representing a second list of items that includes a subset of items selected from the first list of items, the first decision node representing a decision with respect to the second list of items;
generating a second set of rules based on the binary decision diagram; and
providing the second set of rules to a second data processing system comprising one or more computer processors and capable of processing the second set of rules.

27. The computer-readable medium of claim 26 in which each bit position in the bit vector corresponds to a pharmaceutical, and the bit vector represents a list of pharmaceuticals.

28. The computer-readable medium of claim 27 in which the first decision node includes a Boolean operator, the operands include a first operand that represents a first pharmaceutical and a second operand that includes the bit vector, and the expression represents a relation between the first pharmaceutical and the list of pharmaceuticals.

29. The computer-readable medium of claim 26 in which the first and second sets of rules include rules for processing insurance claims.

30. The computer-readable medium of claim 26 in which the first set of rules includes a set of order-dependent rules, and the second set of rules includes a set of order-independent rules.

31. The computer-readable medium of claim 26 in which the binary decision diagram includes a second decision node that includes an expression having a Boolean operator and operands, one of the operands including a bit vector corresponding to the first list of items, and wherein the method includes combining the first and second decision nodes to form a third decision node that includes an operand generated based on a result of a Boolean operation on the bit vector in the first decision node and the bit vector in the second decision node.

32. The computer-readable medium of claim 26 in which, when supplied a set of inputs, the first set of rules evaluates to a result, and the second list of rules evaluates to the same result.

33. A computing system configured to carry out operations for converting an order-dependent list of data processing rules capable of being processed by a first data processing system comprising one or more computer processors to an order-independent list of data processing rules capable of being processed by a second data processing system comprising one or more computer processors, the operations including:
receiving a first order-dependent list of data processing rules,
wherein a rule of the order-dependent list of data processing rules includes a condition that includes a Boolean operator applied to a data variable when the rule is processed by the first data processing system;
identifying the conditions of two of the order-dependent data processing rules of the first order-dependent list of data processing rules;
generating a new order-dependent data processing rule based on the two of the order-dependent data processing rules of the first order-dependent list of data processing rules, the new order-dependent data processing rule including one of the identified conditions from one of the at least two order-dependent data processing rules, and the new order-dependent data processing rule including another identified condition from another of the two order-dependent data processing rules;
generating a second order-dependent list of data processing rules including the new order-dependent data processing rule;
generating a binary decision diagram based on the second order-dependent list of data processing rules, the binary decision diagram including decision nodes that include expressions including Boolean operators and operands;
generating an order-independent list of data processing rules based on the binary decision diagram; and
providing the order-independent list of rules to the second data processing system.

34. The system of claim 33, in which generating an order-independent list of rules based on the binary decision diagram includes generating a flat expression representation of the binary decision diagram.

35. The system of claim 33, the operations including:
removing an expression of one of the decision nodes of the binary decision diagram.

36. The system of claim 35 in which removing an expression of one of the decision nodes of the binary decision diagram includes determining a semantic meaning of one of the operands.

37. The system of claim 33 in which one of the decision nodes includes an operand that includes a bit vector.

38. The system of claim 33 in which, when supplied a set of inputs, the first order-dependent list of rules evaluates to a result, and the order-independent list of rules evaluates to the same result.

39. The system of claim 33 in which the first order-dependent list of rules can be processed by a first system but cannot be processed by a second system, the second system being configured to process order-independent rules, and the method includes processing the order-independent list of rules using the second system.

40. A computing system configured to carry out operations for converting an order-dependent list of data processing rules capable of being processed by a first data processing system comprising one or more computer processors to an order-independent list of data processing rules capable of being processed by a second data processing system comprising one or more computer processors, the operations including:

receiving a first set of rules, wherein the first set of rules is based on data processing rules capable of being processed by a first data processing system comprising one or more computer processors, wherein a rule of the first set of rules includes a condition that includes a Boolean operator applied to a data variable when the rule is processed by the first data processing system;

generating a binary decision diagram according to the first set of rules, the binary decision diagram having a first decision node that includes an expression having a Boolean operator and operands, one of the operands including a bit vector having two or more bits, each bit position in the bit vector corresponding to one item in a first list of items, the bit vector representing a second list of items that includes a subset of items selected from the first list of items, the first decision node representing a decision with respect to the second list of items;

generating a second set of rules based on the binary decision diagram; and providing the second set of rules to a second data processing system comprising one or more computer processors and capable of processing the second set of rules.

41. The system of claim 40 in which each bit position in the bit vector corresponds to a pharmaceutical, and the bit vector represents a list of pharmaceuticals.

42. The system of claim 41 in which the first decision node includes a Boolean operator, the operands include a first operand that represents a first pharmaceutical and a second operand that includes the bit vector, and the expression represents a relation between the first pharmaceutical and the list of pharmaceuticals.

43. The system of claim 40 in which the first and second sets of rules include rules for processing insurance claims.

44. The system of claim 40 in which the first set of rules includes a set of order-dependent rules, and the second set of rules includes a set of order-independent rules.

45. The system of claim 40 in which the binary decision diagram includes a second decision node that includes an expression having a Boolean operator and operands, one of the operands including a bit vector corresponding to the first list of items, and wherein the method includes combining the first and second decision nodes to form a third decision node that includes an operand generated based on a result of a Boolean operation on the bit vector in the first decision node and the bit vector in the second decision node.

46. The system of claim 40 in which, when supplied a set of inputs, the first set of rules evaluates to a result, and the second list of rules evaluates to the same result.

47. A computing system for converting an order-dependent list of data processing rules capable of being processed by a first data processing system comprising one or more computer processors to an order-independent list of data processing rules capable of being processed by a second data processing system comprising one or more computer processors, the system including:

means for receiving a first order-dependent list of data processing rules, wherein a rule of the order-dependent list of data processing rules includes a condition that includes a Boolean operator applied to a data variable when the rule is processed by the first data processing system;

means for identifying the conditions of two of the order-dependent data processing rules of the first order-dependent list of data processing rules;

means for generating a new order-dependent data processing rule based on the two of the order-dependent data processing rules of the first order-dependent list of data processing rules, the new order-dependent data processing rule including one of the identified conditions from one of the two order-dependent data processing rules, and the new order-dependent data processing rule including another identified condition from another of the two order-dependent data processing rules;

means for generating a second order-dependent list of data processing rules including the new order-dependent data processing rule;

means for generating a binary decision diagram based on the second order-dependent list of data processing rules, the binary decision diagram including decision nodes that include expressions including Boolean operators and operands;

means for generating an order-independent list of data processing rules based on the binary decision diagram; and means for providing the order-independent list of rules to the second data processing system.

48. A computing system for converting an order-dependent list of data processing rules capable of being processed by a first data processing system comprising one or more computer processors to an order-independent list of data processing rules capable of being processed by a second data processing system comprising one or more computer processors, the system including:

means for receiving a first set of rules, wherein the first set of rules is based on data processing rules capable of being processed by a first data processing system comprising one or more computer processors, wherein a rule of the first set of rules includes a condition that includes a Boolean operator applied to a data variable when the rule is processed by the first data processing system;

means for generating a binary decision diagram according to the first set of rules, the binary decision diagram having a first decision node that includes an expression having a Boolean operator and operands, one of the operands including a bit vector having two or more bits, each bit position in the bit vector corresponding to one item in a first list of items, the bit vector representing a second list of items that includes a subset of items selected from the first list of items, the first decision node representing a decision with respect to the second list of items;

means for generating a second set of rules based on the binary decision diagram; and means for providing the second set of rules to a second data processing system comprising one or more computer processors and capable of processing the second set of rules.

* * * * *

UNITED STATES PATENT AND TRADEMARK OFFICE
CERTIFICATE OF CORRECTION

PATENT NO. : 10,318,872 B1  
APPLICATION NO. : 14/210659  
DATED : June 11, 2019  
INVENTOR(S) : Carl Richard Feynman, Ian Schechter and David Fournier Page 1 of 1

It is certified that error appears in the above-identified patent and that said Letters Patent is hereby corrected as shown below:

In the Claims

Column 15, Line 12, Claim 10, after "at least", insert -- one --.

Column 15, Line 17, Claim 11, after "at least", insert -- one --.

Column 16, Line 31, Claim 19, after "the", insert -- at least --.

Column 20, Line 13, Claim 47, after "the", insert -- at least --.

Signed and Sealed this  
Seventeenth Day of December, 2019

Andrei Iancu  
*Director of the United States Patent and Trademark Office*